Jan. 12, 1971     A. K. CHITAYAT     3,554,632
FIBER OPTICS IMAGE ENHANCEMENT USING ELECTROMECHANICAL EFFECTS
Filed Aug. 29, 1966     2 Sheets-Sheet 1
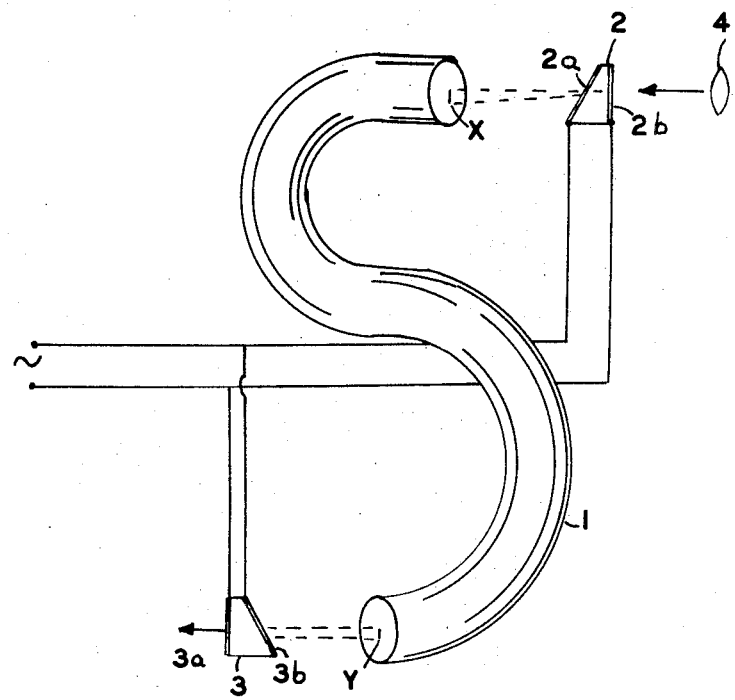
FIG 1
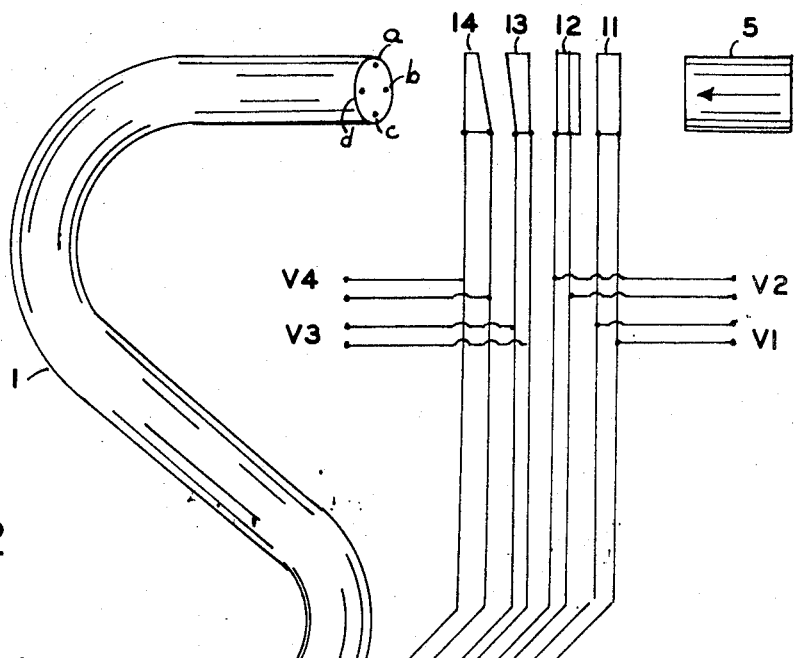
FIG 2
*INVENTOR.*
ANWAR K. CHITAYAT
BY 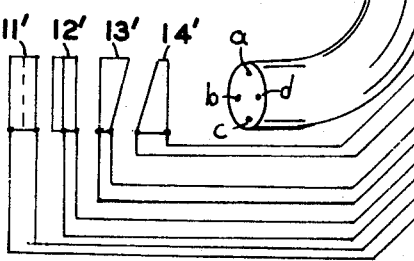

United States Patent Office 3,554,632
Patented Jan. 12, 1971

3,554,632
FIBER OPTICS IMAGE ENHANCEMENT USING
ELECTROMECHANICAL EFFECTS
Anwar K. Chitayat, Plainview, N.Y., assignor to
OPTOmechanisms, Inc., Plainview, N.Y.
Filed Aug. 29, 1966, Ser. No. 575,797
Int. Cl. G02b 5/14
U.S. Cl. 350—96
4 Claims

ABSTRACT OF THE DISCLOSURE

Apparatus for enhancing the quality of transmission in fiber optic cables using input and output optical elements having electromechanical properties. The input and output optical means may be optical wedges of material having electro-optical properties, for instance electro-optical materials so that by the application of voltage to the element, the angle between the entrance and exit beam is changed. Compensating optical means are provided at the exit end and the same voltage is applied to the exit optical means to restore the image.

---

This invention relates to means for enhancing the quality of transmission in fiber optic cables and more particularly to such means using optical elements having electromechanical properties.

More specifically, means are provided for scanning, or otherwise moving, the input image in a predetermined manner and corresponding means are provided to the exit end of the cable to restore the image.

This application is an improvement over my Pat. No. 3,217,589, entitled: Fiber Optics Image Enhancement Means With Image Rotation, granted Nov. 16, 1965 which shows a rotatable wedge system.

The particular improvement of the present invention utilizes Pockells' effect which is that the input and output optical means may be optical wedges of material having electro-optical properties, for instance electro-optical materials so that by the application of voltage to the element, the angle between the entrance and exit beam is changed. Compensating optical means are provided at the exit end and the same voltage is applied to the exit optical means to restore the image.

The optical deviation means are stationary and there are no mechanically moving parts. Optical deviation means other than wedges or prisms may be used.

The image may be moved or scanned in many different paths by the application of two or more voltages to two or more input and corresponding output optical elements. For instance, the light rays may be scanned in a pattern corresponding to Lissagou figures or they may be scanned by randow voltages or even pure noise voltages.

The present state of the art of flexible fiber cables is such that a good quality image cannot be transmitted through a flexible fiber cable (fiberscope). The reason for this is actual manufacturing difficulties whereby spaces are observed between the fiber bundles in addition to quite a few broken fibers throughout the section of the cable. Consequently, it is proposed that the transmission qualities of the fiber cable be enhanced by means outside the cable.

The proposed technique is to integrate the image transmitted through the fiber cable over a large section of the fiber cable. In other words, if a person were to take the fiber cable and vibrate it around the axis at extremely high rates, then he would see an image which is far superior than if the cable were not to vibrate. However, this vibration is not practical in almost all situations where a fiber cable is to be used. The proposed approaches to the problem may then be solved by electro-optical elements at the two ends of the fiber cable. A first wedge is placed close to the entrance of the fiber cable. This wedge displaces the image by a fixed distance. Now, if one compresses the wedge or change its index of refraction by an applied voltage, then the image moves or scans.

At the exit of the fiber cable a similar wedge configuration is repeated to displace the image back to the original optical axis. The two wedges are operated in phase synchronism. Consequently, the image observed at the exit is not changed by the introduction of the entrance and exit wedges. Thus, if the entrance wedges are deviated in synchronism with the exit wedges, the image transmitted through the cable would appear stationary.

Accordingly, a principal object of the invention is to provide new and improved image enhancement means.

Another object of the invention is to provide new and improved image enhancement means for fiber optical cables.

Another object of the invention is to provide new and improved image enhancement means for fiber optical cables using electro-optical elements.

Another object of the invention is to provide new and improved image enhancement means for fiber optical cables having electro-optical characteristics whereby a voltage is applied to the element in order to change its deviating angle and thereby the optical deviation.

Another object of the invention is to provide new and improved means for fiber optical cables comprising compensating input and output optical elements, said elements being adapted to receive voltage across their faces and responsive thereto to change their dimensions and the optical deviation proportionally to said voltages.

Another object of the invention is to provide new and improved enhancement means for optical cables using non-rotating and non-moving means.

Image enhancement means for fiber optical cables of the prior art generally having rotatable or otherwise moving input and output optical deviation means in combination with means for synchronization. These mechanically rotating or moving devices and the necessary synchronization means causes mechanical problems and require a considerable amount of high quality precision machine parts.

The applicant has found that the deviations may be achieved by applying voltages across stationary optical elements at the input and output of the cable in order to scan or otherwise move the image with respect to the fiber in the cable.

A great advantage of the present invention is that innumerable varieties of patterns or even random movements may be produced with perfect synchronization since there are no moving parts which are liable to wear out and or get out of synchronization.

These and other objects of the invention will be apparent from the following specification and drawings of which:

FIG. 1 is a perspective view of an embodiment of the invention.

FIG. 2 is a perspective view of another embodiment of the invention.

Figures 3, 4:
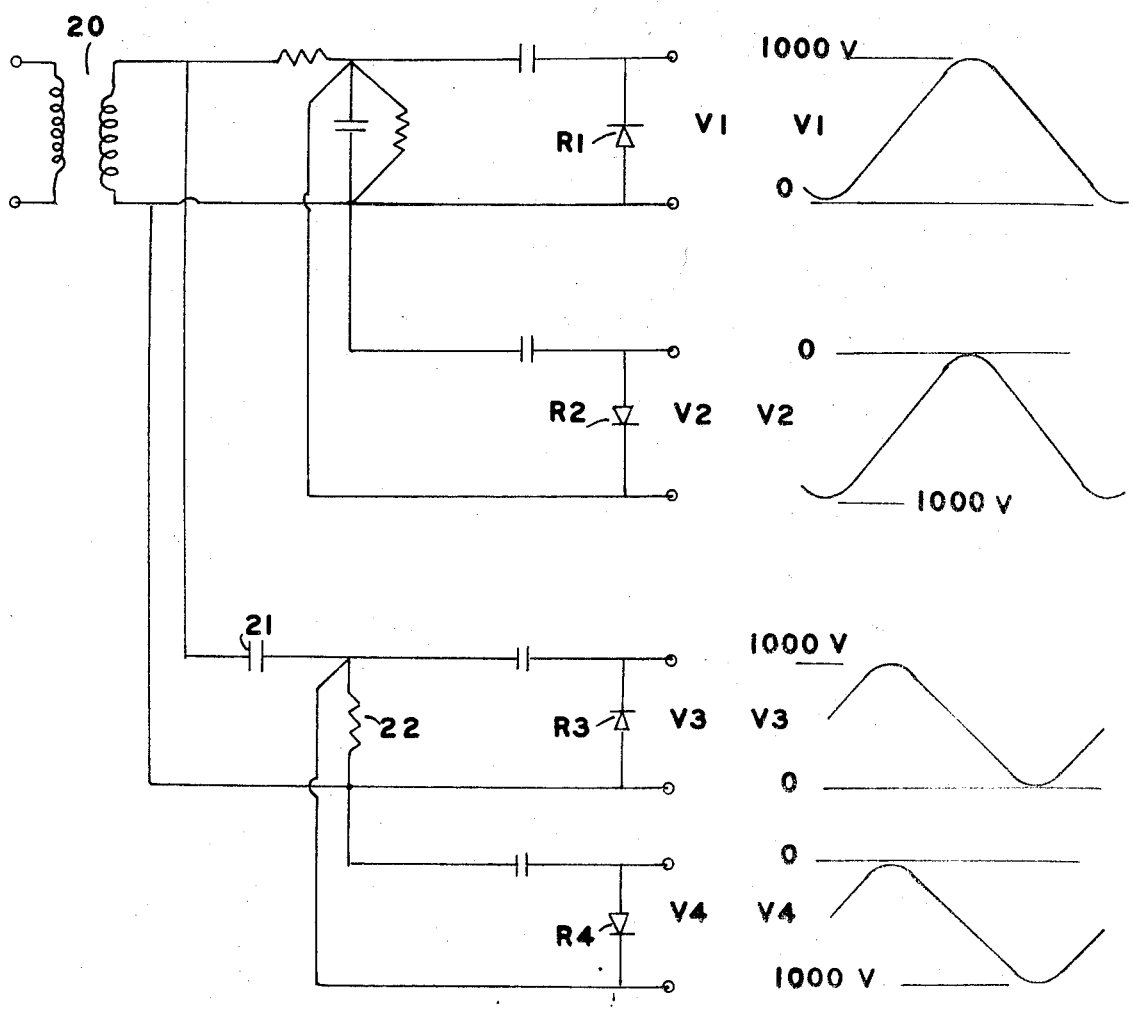
FIG. 3 is a schematic circuit diagram of the power supply for providing circular scanning.
FIG. 4 illustrates the wave forms of voltages produced in the circuit of FIG. 3.

More particularly, referring to the figures, FIG. 1 shows a fiber optic cable 1 having an input optical element 2 at the entrance of the cable and a compensating member 3 at the exit of the cable. Light rays are focused by the lens 4 on the entrance of the optical wedge 2 wherein they will normally be deviated downwards by the wedge 2 for instance, to the point X onto the entrance face of the cable. These light rays will then pass through the cable and emerge for instance, to the point Y on the exit end of the cable where it is then transmitted through compensating element 3 which causes it to deviate it back to the original position. Elements 2 and 3 are a matched set located and adjusted to deviate and compensate the original image.

In order to produce movement of the light rays with respect to the ends of the cable and thereby scan the light rays on the image over the face of the cable, voltage is applied across the optical elements. More specifically, transparent conductive coatings 2a, 2b, 3a and 3b are applied to each face of the optical elements 2 and 3 and voltages are applied across the faces. The optical elements are made of material such as quartz (KDP or ADP) or other crystals which have electro-optical characteristics whereby when a voltage is applied across the element it changes the deviation angle of the wedge by changing its index of refraction.

In order to improve two dimensional resolution of images through fiber optics and enhance their image quality, it is necessary to dynamically scan both ends of the fiber. In a flexible bundle, it is necessary to scan both ends in synchronisms in order to realize simultaneous relative motion at both ends, while the transmitted image remains stationary.

In applications where a scanning motor cannot be placed due to size or stringent environment, then the following method can be used to realize dynamic scanning.

As shown in FIG. 2, eight electro-optic wedges are supplied, four on each side. The objective lens 5 images the viewed objective at the fiber optic cable. The electro-optics effect of the input wedges 11, 12, 13, and 14 would displace the image from its central location for instance to rotate about a circle a, b, c, d. At the opposite end, a matched set of electro-optic wedges 11', 12', 13', 14' return the beam back to the center. For example, at an instant of time the image is displaced up to point a by the input wedges. The output set of wedges bring it down. At another instant of time, the input wedge displaces the image back to point b while the output wedge means displaces the image to the front. In this manner, the image does not appear to move, but the fibers time share the transmission of images.

In order to develop a circular rotation, a power supply is supplied as shown in FIG. 3, which develops the voltages shown in FIG. 4.

The wedges shown in FIG. 2 are located so that wedge 11 is exactly opposite to wedge 12, while wedge 13 is opposite to wedge 14. Without any applied voltage the image is not displaced. Now, if a voltage is applied to wedge 11 only, the image is displaced for instance, to the right. If the voltage is applied to wedge 12, the image is displaced for instance, to the left. If a voltage is applied to wedge 13, the image moves up, and if it is applied to wedge 14 it moves down. Four sinusoidal inputs are supplied to the wedges as shown in FIG. 4 resulting in a circular rotation. These exact same voltages are applied to the matched optical wedges at the other end of the cable to realize the same, but opposite displacement, in order to realize a stationary image when observed at the end.

More particularly, FIG. 2 shows an embodiment of the invention showing a fiber optic cable 1, a plurality of optical wedges 11, 12, 13, 14 which are mounted to the front end of the cable. The plurality of wedges are each provided with one of a plurality of voltages V1, V2, V3, V4 which are applied to the wedges 11, 12, 13, 14 respectively. The wedges are preferably in matched compensating sets for the purpose of correcting chromatic aberrations for instance, the wedges 13 and 14 are one set of wedges and 11 and 12 are a second set and the second set is preferably rotated 90° with respect to the first set.

The output wedges are designed to compensate for the input deviations to restore the image to normal position in output lens 7.

FIG. 4 shows typical voltages V1, V2, V3, V4 which provide a circular pattern. Note that the voltages V1 and V3 are 90° out of phase and V2 and V4 are 90° out of phase, this arrangement will provide a circular motion as the voltages have the same magnitude. If not, it will be elliptical in the same manner as Lissagou figures are produced in cathode ray tubes.

A corresponding plurality set of wedges 11', 12', 13' and 14' are provided at the exit end of the cable and the same voltages V1, V2, V3, V4 are applied to these elements. The exit wedges are compensating with respect to the entrance wedges so as to restore the image to its original position.

FIG. 3 shows a circuit diagram for providing voltages V1, V2, V3 and V4. The alternating current is fed to transformer 20 and the voltages V1, V2, V3, V4 are generated across the rectifiers R1, R2, R3 and R4. The network comprises the condenser 21 and the resistor 22, shifts the voltage V3 90° with respect to the voltage V1. Voltages V1 and V2 are in phase with each other except voltage V1 is always positive and voltage V2 is always negative due to the rectifier action.

Voltages V3 and V4 are in phase with each other except voltage V3 is always positive and voltage V4 is always negative due to the rectifier action.

The voltages we are referring to are about 1000 volts peak to peak value. The minimum recommended thickness for the optical element is .04 inch. It is recommended that the flat surface be flat to one quarter wavelength. The flat surfaces each have a transparent conductive coating such as vacuum evaporated tin oxide. The resistance between the center and edges of the flat surfaces of the wedges preferably does not exceed 200 ohms.

Suitable connecting clips or terminals may be mounted to apply the voltage across the flat surface of the elements. The elements must be cut in accordance with their crystal structure so that the displacement will change proportionally to the voltage applied and he material must be homogenous so that the angle of deviation is constant.

Various materials have electro-optical characteristics. However, all of them are not suitable since the material also must be transparent. One material that is suitable is quartz or electro-optic crystals such as KDP or ADP.

It is possible that the elements could be made of material which are responsive to other forces such as magnetic forces or direct mechanical forces, to achieve an optical displacement.

I claim:
1. Image enhancement means for fiber optical cables comprising,
   first optical deviation means of material having electro-optical properties located before the front end of said cable,
   said optical deviation means having conductive coatings on its front and rear surfaces,
   means to apply a voltage between said surfaces to thereby change the optical deviation of said deviation means,
   second optical deviation means located at the end of said cable,
   said second deviation means being identical to said first deviation means but being arranged to have a compensating deviation,
   said optical deviation means having conductive coatings on its front and rear surfaces,
   means to apply said voltage between said surfaces and thereby change the deviation of said deviation means,
   whereby light rays which are scanned across the entrance of said fiber optical cable by said change in deviation are then scanned in a compensating manner by the exit deviation means.

2. Apparatus as in claim 1 wherein the deviation means comprises optical wedges at the entrance of said fiber optical cable and at the exit of said cable, means to apply separate voltages to corresponding wedges at each end of said cable whereby an image projected on the entrance wedges is scanned across the entrance face of said fiber optical cable and is scanned by the exit wedges in a compensating manner to thereby restore the original image.

3. Apparatus as in claim 2 wherein said entrance and exit optical wedges comprise matched sets of wedges to thereby correct chromatic aberrations.

4. Apparatus as in claim 1 wherein said deviation means are optical wedges.

References Cited

UNITED STATES PATENTS 3,110,762  11/1963  Frank _____ 350—96X
3,374,358  3/1968  Majima _____ 350—150X JOHN K. CORBIN, Primary Examiner U.S. Cl. X.R.

350—150